United States Patent [19]
Cole, Jr.

[11] 3,811,660
[45] May 21, 1974

[54] EQUIPMENT FOR MAKING FOAM FOR DUST SUPPRESSION AND OTHER PURPOSES

[76] Inventor: Howard W. Cole, Jr., 12 Vale Dr., Mt. Lakes, N.J. 07046

[22] Filed: Mar. 30, 1973

[21] Appl. No.: 346,286

Related U.S. Application Data

[63] Continuation-in-part of Ser. No. 91,371, Nov. 20, 1970, abandoned.

[52] U.S. Cl.......... 261/18 B, 261/35, 261/DIG. 26, 169/15
[51] Int. Cl............................................. A62c 5/04
[58] Field of Search............ 261/DIG. 26, 35, 18 B; 418/97; 169/15

[56] References Cited
UNITED STATES PATENTS

| | | | |
|---|---|---|---|
| 624,943 | 5/1899 | Johnston | 418/97 |
| 2,201,040 | 5/1940 | Hansen-Ellehammer | 261/DIG. 26 |
| 2,543,941 | 3/1951 | Sargent | 261/DIG. 26 |
| 2,673,723 | 3/1954 | Keen | 261/DIG. 26 |
| 2,707,480 | 5/1955 | Klosse | 169/15 |
| 3,164,374 | 1/1965 | Ralph | 261/DIG. 26 |
| 3,186,490 | 6/1965 | Jamison et al. | 261/DIG. 26 |
| 3,337,195 | 2/1967 | Farison | 261/DIG. 26 |
| 3,465,827 | 9/1969 | Levy et al. | 261/DIG. 26 |
| 3,512,761 | 5/1970 | O'Regan et al. | 261/DIG. 26 |
| 3,620,306 | 11/1971 | Shepard | 261/DIG. 26 |

FOREIGN PATENTS OR APPLICATIONS

| | | | |
|---|---|---|---|
| 630,209 | 10/1947 | Great Britain | 261/DIG. 26 |
| 644,103 | 7/1962 | Canada | 261/DIG. 26 |

*Primary Examiner*—Tim R. Miles
*Attorney, Agent, or Firm*—Sandoe, Hopgood, & Calimafde

[57] ABSTRACT

This system generates foam which is discharged into broken masses of coal or other dusty products at the locations where the coal is broken loose from a mine vein, or at conveyor or other transfer points for any dusty material. Nozzles discharge the foam under conditions that cause the foam to penetrate the dusty mass of material. The amount of foam required is regulated automatically by the weight of the coal or other material. The system also functions as a fire suppression system which can be automatic with fire detector means located at places to be protected. The foam generator maintains a constant ratio of air to water, but the apparatus is adjustable to change the ratio when desired.

9 Claims, 5 Drawing Figures

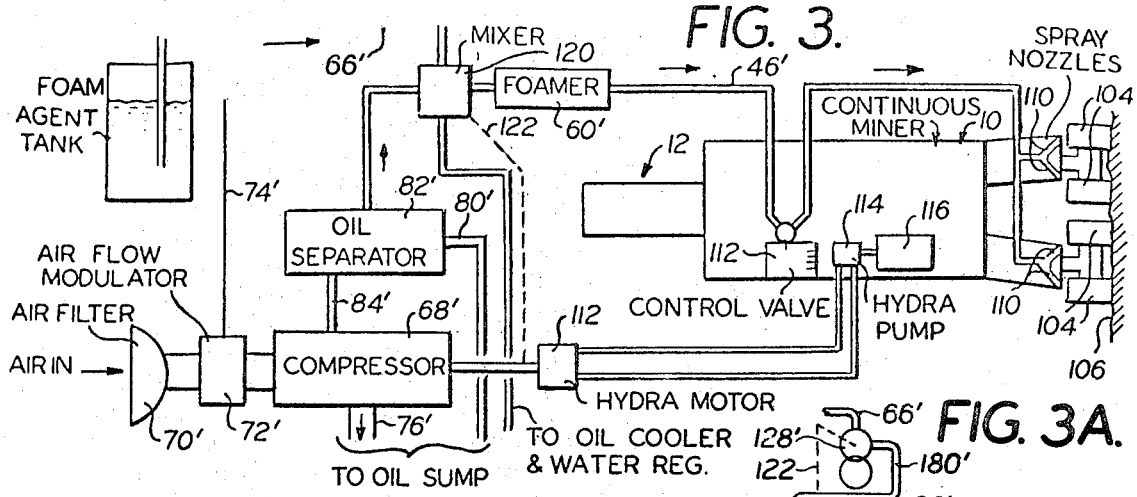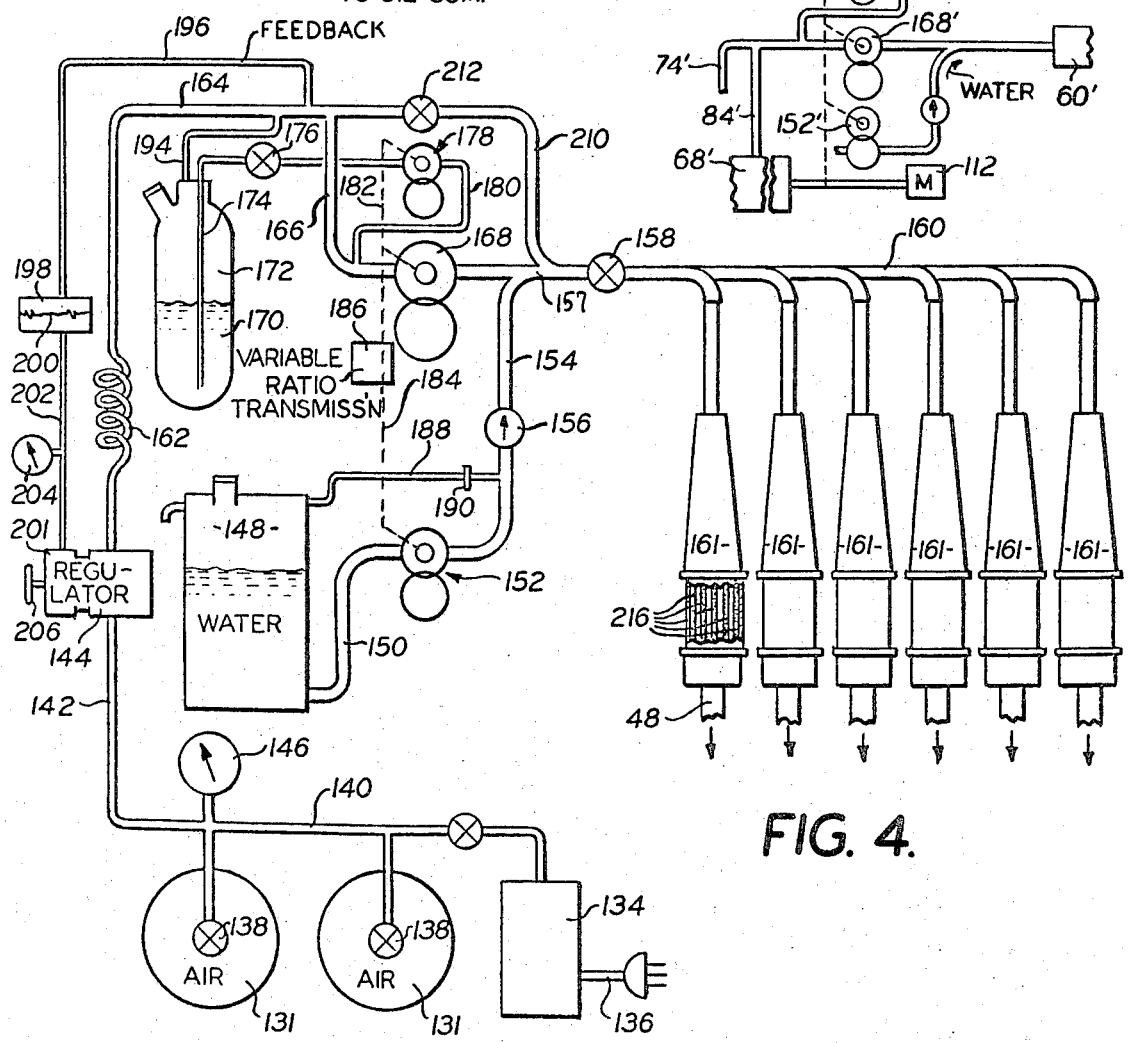

3,811,660

EQUIPMENT FOR MAKING FOAM FOR DUST SUPPRESSION AND OTHER PURPOSES

BACKGROUND AND SUMMARY OF THE INVENTION

This application is a continuation-in-part of application Ser. No. 91,371, filed Nov. 20, 1970, now abandoned.

Government regulations relating to dust suppression have been made much stricter, and prior equipment for the purpose of dust suppression has been inadequate or uneconomical. It is the object of this invention to use foam for dust suppression and to generate and apply the foam in such a way as to effectively suppress the dust and at the same time to keep the quantity of foam that is used within economical limits.

For use in coal mines, this invention applies foam to the coal at the location where the coal is broken loose from the face of the vein, and there is foam in the coal as it is placed on the conveyor which carries it back away from the face of the vein. If dust in the coal has not been previously treated as above, it will be made airborn whenever the coal is discharged from a conveyor to another conveyor, and at such locations foam can be projected into the mass of coal as the pieces pass from the first conveyor to the second conveyor. While the mass is loose during transfer, the foam can be discharged from nozzles with a velocity to penetrate the mass of coal and to coat the particles, particularly the dust particles.

Since the amount of foam needed depends upon the amount of coal to be coated, greater efficiency is obtained with this invention by having a load cell that detects the weight of coal as it approaches a transfer station and that regulates the discharge of foam in accordance with the weight.

The foam system of this invention is also suitable for fire suppression, and the same apparatus can be used for both dust and fire suppression with different nozzles at appropriate locations and with fire detecting means at the locations to be protected.

Since the foam demand varies over a substantial range, this invention includes special means for maintaining a substantially constant ratio of air to water in the foam generating system in spite of variations in the volume of foam to be generated. The ratio is adjustable to produce foams of different quality for particular applications.

One embodiment of the invention uses the compressed air supplied for the foam to drive the water pump so that the ratio of air to water will remain constant. Another feature is the injection of foaming agent into the air-operated motor to seal clearances and to make the displacement of the motor proportional to the volume of air supplied. The air-water ratio is adjustable, depending upon how wet a foam is wanted.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 3 is a diagrammatic view showing the continuous miner of FIG. 1 and illustrating the way in which dust is suppressed when the miner is in operation breaking coal from the face of a vein;

FIG. 3A is a view of the mixer of FIG. 3; and

FIG. 4 is a diagrammatic view showing another modification of the invention and illustrating apparatus for maintaining a constant ratio of air, water and foaming agent for a foam generating system.

DESCRIPTION OF PREFERRED EMBODIMENT

Figure 1:
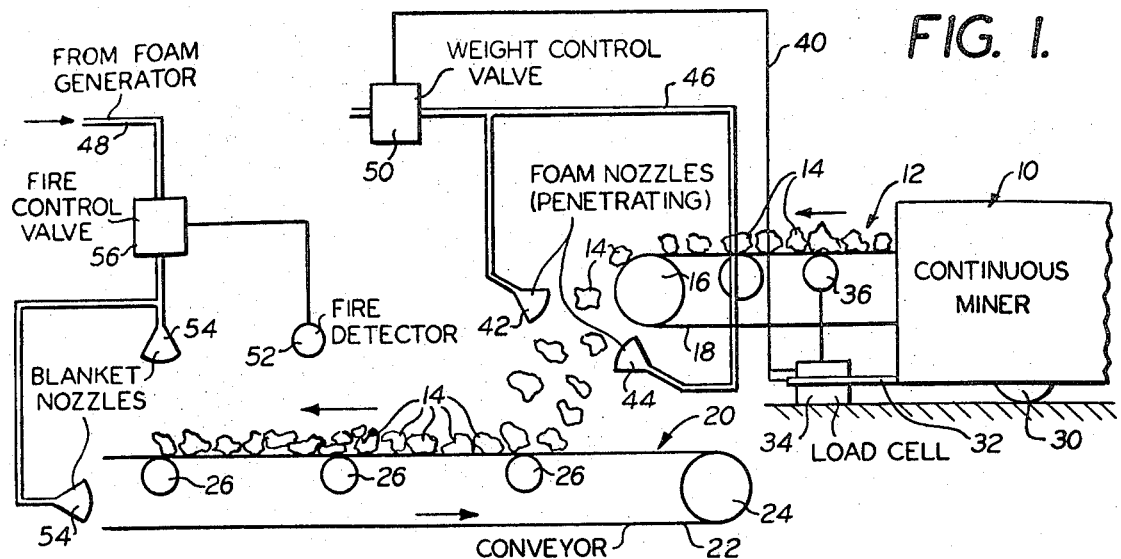
FIG. 1 is a diagrammatic view showing a continuous miner that delivers broken coal from its conveyor to another conveyor with means for preventing dust at the transfer station by projecting foam against the broken material as it falls from one conveyor to the other.

A continuous miner 10 has a conveyor 12 by which it delivers coal 14 back from the face of the vein on which the continuous miner operates. Coal 14 discharged from the conveyor 12 falls onto another conveyor 20 which transfers the coal back to a car or other collection location in the chamber or beyond the chamber. The conveyor 20 has a continuous belt 22 which reverses its direction of travel around a roller 24 at the forward end of the conveyor 20. There are rollers 26 at spaced locations along the upper run of the belt 20 for supporting the belt that carries the coal 14.

The power used by the main motor or motors which drive the cutting head of the continuous miner can provide "quantity of coal removed" information, if the coal is not weighed by a load cell.

The continuous miner 10 has wheels 30, or an endless track, which rest on a floor 32 of the mine chamber. There is a load cell 34 which also rests on the machine frame 32 and this load cell has a roller 36 extending across the full width of the belt 18 of the converyor 12 for supporting a portion of the belt between other rollers of the conveyor.

The roller 36 is pressed downward by the weight of the coal 14 on the portion of the belt 18 which is supported by the roller 36. The extent to which the roller 36 is depressed depends upon the weight of the coal. The load cell 34 sends an electric signal through a conductor 40 and this signal has an intensity proportion to the weight of the coal.

There are foam nozzles 42 and 44 located in the space between the discharge end of the conveyor 12 and the top of the conveyor 20 onto which the coal 14 falls during its transfer between from one conveyor to the other. The foam nozzle 42 is located above the mass of the falling coal and the foam nozzle 44 is located below the coal. Since the lumps of coal separate from one another while falling from the conveyor 12, foam from the nozzles 42 and 44 can be discharged under pressure to effectively coat the coal throughout the falling mass. There can be a number of nozzles 42 and 44 extending across the full width of the conveyor, or the nozzles can be otherwise oriented so that the foam is discharged against the mass of coal throughout the full cross-section of the mass.

Foam is supplied to the nozzles 42 and 44 through tubing 46 leading from a foam supply line 48. There is a valve 50 in series with the tubing 46 and this valve 50 has an actuator for opening and closing the valve in accordance with the signal received through the conductor 40. When the amount of coal passing across the roller 36 increases, this is an indication that more coal is going to drop from the conveyor 12 to the conveyor 20 during the next instant and the increase in the signal to the weight control valve 50 causes the valve to open wider and supply more foam to the nozzles 42 and 44. Conversely, when the weight of coal bearing down on the roller 36 decreases, it indicates a reduction in the mass of coal that is going to fall from the conveyor 12 in the next instant and the weight control valve 50 reduces the amount of foam commensurate in the reduction in the amount of coal to be coated.

The apparatus shown in FIG. 1 is also used for fire protection. A fire detector 52 is located along the length of the conveyor 20 and there are foam blanketing nozzles 54 located along the conveyor 20 downstream from the fire detector 52. The fire detector supplies a signal to an actuator of fire control valve means 56 which open the valve to supply foam to the nozzles 54 whenever a fire is detected by the fire detector 52. Foam to the fire control valve 56 comes from the same foam supply line 48 as is used for the dust suppression nozzles 42 and 44. Fire detectors are well-known and no further description of the fire detector 52 is necessary for a complete understanding of this invention.

Figure 2:
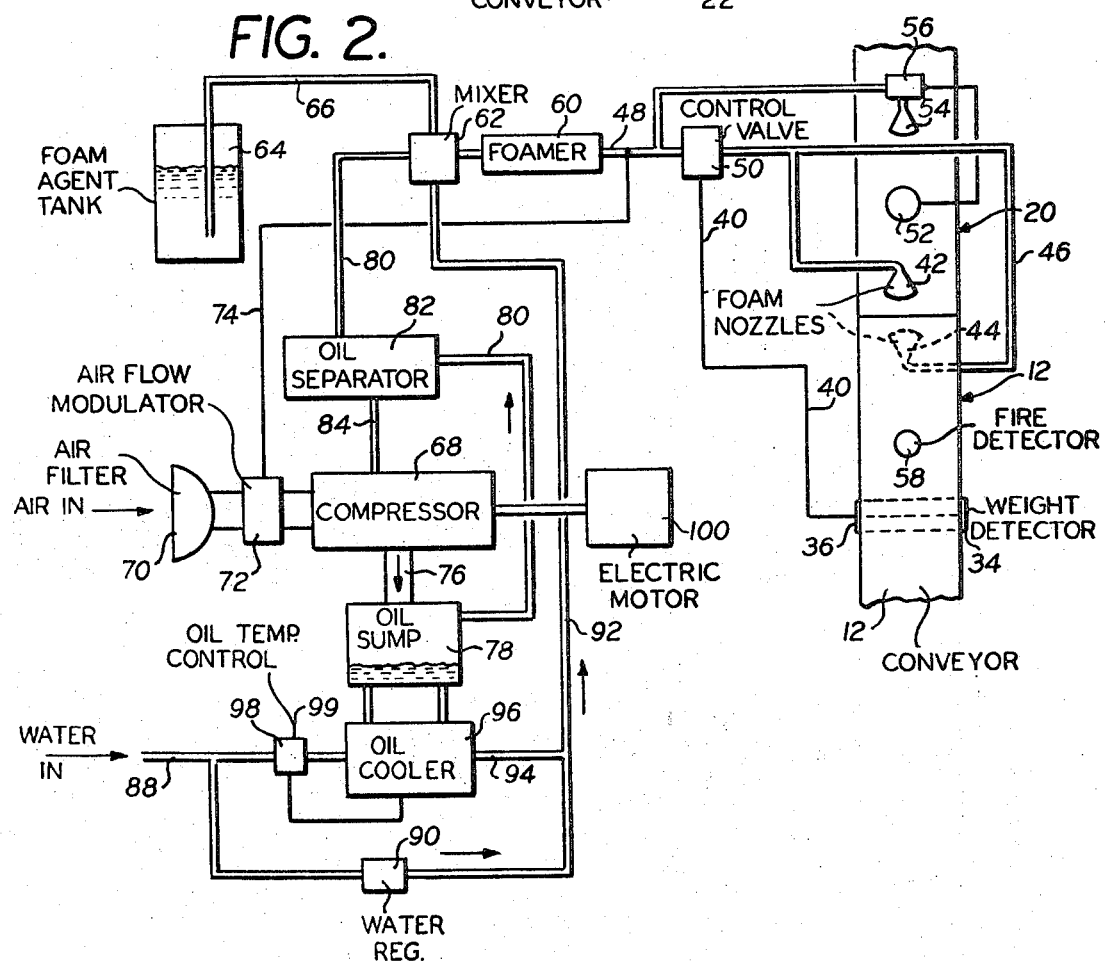
FIG. 2 is a top plan view of the apparatus shown in FIG. 1 together with apparatus for generating foam for the nozzles used for dust suppression and for fire.

FIG. 2 shows the conveyors 12 and 20 in plan view and shows some of the other equipment of FIG. 1 with the same reference characters applied as in FIG. 1. There is an additional fire detector 58 for detecting fire on the conveyor 12. Nozzles for the fire detector 58 are not illustrated but it will be understood that they can be the same as for the fire detector 52 but merely located just beyond the fire detector 58 instead of further along on the conveyor 20 as is the case in the nozzles 54.

FIG. 2 also shows a foamer or foam generator 60 for supplying the foam to the foam supply line 48. Foaming agent is supplied to a mixer 62 from a foaming agent tank 64 through tubing 66. Air is supplied to the mixer 62 from an air compressor 68 which draws air in through a filter 70 through an air flow modulator 72 which can be adjusted to change the amount of air entering the compressor 68. The air flow modulator is controlled by a feedback 74 from the tubing 48. Increase in flow through the tubing 48, causes more air to be admitted to the compressor 68 through the air flow modulator 72; and conversely a reduction in the flow in the tubing 64 operates the air flow modulator 72 to reduce the amount of air entering the compressor 68 since such a reduction in flow beyond the foamer indicates a reduced demand for foam.

The compressor 68 discharges compressed air through an outlet conduit 76 to an oil sump 78 and from the oil sump 78 the compressed air passes through tubing 80 to the mixer 62. An oil separator 82 is located in series with the tubing 84 for removing residual oil from the compressed air and the oil which is removed from the air by the oil separator 82 drains back to the compressor 68 through tubing 84.

Water is supplied to the mixer 62 from a water supply line 88 through a water pressure regulator 90 and tubing 92. There is a bypass 94 for the water and this bypass supplies some water to an oil cooler 96 connected to the oil sump 78. The flow of cooling water through the oil cooler 96 is controlled by a valve 98 in an oil temperature control 99 which moves the valve 98 toward open or closed position to increase or decrease flow of water to the oil cooler 96 in accordance with the temperature of the oil.

The compressor 68 is driven by an electric motor 100 in the system shown in FIG. 2. In the mixer 62 the air, water and foaming agent are mixed in the desired proportion and these proportions are controlled by regulating the water pressure at the regulator 90 and the air supply at the air flow modulator 72. This modulator 72 can be manually controlled if desired. The amount of foaming agent drawn into mixer 62 depends upon the flow of water or air or both and is drawn in by aspirator action or positive displacement pump. Such mixers are well known and no further explanation of the construction is necessary for a complete understanding of this invention.

FIG. 3 shows the continuous miner 82 with cutters 104 located at its forward end for cutting coal from the face of a coal vein 106. Since dust is generated by the breaking up of the coal at the face of the vein, foam spray nozzles 110 are supplied in position to spray foam into the coal as it is broken loose from the face 106 by the cutters 104. Thus the dust is suppressed at the locations where the coal is initially broken up and the coal which is loaded on the forward end of the conveyor 12 is already coated to a large extent with foam.

The supply of foam to the spray nozzles 110 is controlled in FIG. 3 by a manually operated control valve 112 which is actuated by an attendant in position to watch the operation of the continuous mining machine 10 so that he can vary the amount of foam supplied in accordance with the rate at which material is being broken from the face of the vein. The foam supplied to the control valve 112 comes through tubing 46' and the other apparatus for making the foam for the supply line 46' is indicated in FIG. 3 by the same reference characters as in FIG. 2 but with a prime appended. The water supply, oil sump and oil cooler are not illustrated in FIG. 3 since they are the same as in FIG. 2.

There is a difference in FIG. 3 from the power supply to the compressor 68' as compared to the compressor drive of FIG. 2. The compressor 68' is driven by a hydraulic motor 112 which is supplied with working fluid from a hydraulic pump 114 located on the frame of the continuous miner 10. This hydraulic pump 114 is driven by an electric motor 116 from the same power source that supplies the power for operating the cutters 104 of the continuous miner.

FIG. 3 differs from FIG. 2 also in the mixer 120 which contains pumps and which is driven by a mechanical connection 122 to the motor 112. This mixer 120 is shown in FIG. 3A and largely the same as that used in FIG. 4 which will now be described. Parts in FIG. 3 corresponding to those of FIG. 4 are indicated by the same reference characters but with a prime appended.

FIG. 4 shows a modified form of the invention which lends itself to portable operation. Air for making foam is contained in a plurality of air bottles or cylinders 131. The air may be originally compressed into the cylinders 131 by a compressor 134 which contains a motor in the unit and which is connected with a power source by a drop cord 136 used to charge the air bottles before the system is transported to its place of use. The air from the bottles 131 is controlled by shut-off valves 138 and the bottles are connected to a header 140 having tubing 142 leading to an air pressure regulator 144. Pressure to the header is indicated by a gauge 146.

The water for making the foam is contained in a portable water tank 148. Water is withdrawn from the tank 148 through tubing 150 which leads to a positive displacement pump 152 such as a vane or gear pump which discharges the water through other tubing 154 having a check valve 156 therein. The water flows from the tubing 154 to a tube 157 and then through a valve 158 to a header 160 to which there are connected a plurality of foamers 161.

The air from the regulator 144 is supplied at reduced pressure through a heater coil 162 and through tubing 164 and 166 to an air metering device 168 which can be used as a motor to drive the pump 152 which meters the water, and a foaming agent metering device 178 which will be described. This device 168 is a positive displacement type motor and may be similar to a vane or gear pump or other apparatus which will rotate at a speed proportional to the rate of flow of air through the motor.

It is difficult to operate a rotary air motor as a positive displacement device because the motor necessarily has some clearances between relatively moving parts and leakage of air through the clearances reduces the volumetric efficiency of the motor so that it does not operate as a true positive displacement device. In order to improve the operation of the air motor 168, this invention seals clearances by injecting the foaming agent into the motor 168 and because of this sealing of the clearances by the foaming agent, the air motor 168 operates at high volumetric efficiency and does operate as a positive displacement device.

The foaming agent 170 is contained in a bottle 172 from which the foaming agent is withdrawn through tubing 174 that projects downwardly in the bottle to a level substantially below the level of the foaming agent and close to the bottom of the bottle 172. The foaming agent is withdrawn from the bottle 172 through the tubing 174 and through a valve 176 by a metering device comprising a pump 178 which may be a gear pump or other positive displacement hydraulic mechanism.

The pump 178 discharges foaming agent through a tube 180 into the air supply tube 166 leading to the air motor 168. Thus the air entering the motor 168 carries with it foaming agent which deposits on the moving parts of the motor 168 to seal the clearances of the motor as previously explained.

The pump 178 is driven from the air motor 168 through a motion transmitting connection indicated diagrammatically by the reference character 182. The motor 168 also operates the water pump 152 through a motion transmitting connection 184 to the air motor 168. This motion transmitting connection 184 includes a variable ratio transmission 186 which can be adjusted to change the speed of the pump 152 with respect to the speed of the motor 168. Thus the variable speed transmission 186 serves as an adjustment for changing the ratio of water to air supplied to the header 160.

There is a by-pass 188 leading from the water line 150 back to the tank 148. This lead contains an orifice 190 which has a substantial pressure drop so that there is no consequential amount of feedback from the water line 150 when the pump 152 is operating, but when the pump 152 and the other pumps 178 and air motor 168 are not running, then water can drain back through the bleed orifice 190 and return line 188 to the tank 148. This insures closing of the check valve 156.

A communicating tube 194 connects the air tube 164 with the foaming agent tank 172 above the level of the foam agent 170 so that there is pressure above the foaming agent to insure uniform flow of the foaming agent to the pump 178. There is also a feedback tube 196 leading from the air line tube 164 back to a chamber 198 which contains a diaphragm 200 having oil or other liquid under it which is in communication with the sensing pressure chamber 201 of the regulator 144 through tubing 202. This feedback tube 196 can connect with the tubing 157 instead of the air tube 164. The tube 196 is merely representative of a feedback that senses pressure conditions, either upstream or downstream of the mixing apparatus, which are a function of conditions where the foam is mixed, and transmits the pressure changes to the sensing chamber of the regulator 144 of FIG. 4 or to the flow modulator 72' of FIG. 3 if the air is supplied directly from a motor driven compressor such as the compressor 68'.

A gauge 204 indicates the pressure in the sensing pressure chamber 144. Like other pressure regulators, the regulator 144 is adjustable to obtain different delivery pressures, the adjustment being effected by a knob 206. Adjustable pressure regulators are a well-known product and no further description of the regulator 144 is necessary for a complete understanding of this invention.

Use of a by-pass tube 210 controlled by an adjustable flow valve 212 extending around the pump 168 will provide an alternate ratio control by reducing the air flow through the air motor 168 and thus reducing the water and agent pumped.

FIG. 3A shows the mixer 120 of FIG. 3 with the various metering devices designated by the same reference characters as in FIG. 4 but with a prime appended. The assembly differs from FIG. 4 in that the metering devices 152', 168' and 178' are driven in unison from the motor 112 instead for using the air metering device 168 as a motor. If the water, air, or foaming agent is supplied to its metering device at a pressure substantially higher than the back pressure on the delivery from that metering device, then, for most types of positive displacement metering devices, the metering device will operate also as a motor to assist in driving the motion transmitting connection 122.

Each of the foamers 161 contains a number of tubes 216, four of these tubes being shown in FIG. 4, though actually there are a large number of tubes distributed in concentric circles across the cross-section of each of the foamers 161. Each of these tubes is filled with stainless steel wool and the flow of the mixture of air, water and foaming agent through the steel wool in the tube 216 causes substantial agitation of the mixture and produces the foaming action. The foam is discharged through the foam supply line 48 and is under substantial pressure until it reaches a nozzle from which it is discharged. The release of pressure causes a substantial expansion of the foam in a well-understood manner.

The preferred embodiments of the invention have been illustrated and described, but changes and modifications can be made and some features can be used in different combinations without departing from the invention as defined in the claims.

I claim:

1. In a foam generating system, lines for supplying air, water, and foaming agent under pressure to a foamer as the ingredients for making foam, a source of compressed air, a positive displacement metering device in the supply line for the compressed air and through which the air is passed under pressure on its way to the foamer, another positive displacement device, in the supply line of one of the other ingredients for metering said other ingredient through its supply line to the foamer, motion transmitting means for driving both of said positive displacement metering devices, means for regulating the pressure of the air supplied to the air metering device, and a feedback sensing the conditions where the foam is mixed for controlling said air pressure regulating means.

2. The foam generating system described in claim 1 characterized by the air pressure regulator having a pressure sensing chamber, and the feedback connecting the pressure sensing chamber of the air pressure regulator with a region of the system where the ingredients are mixed.

3. The foam generating system described in claim 1 characterized by the source of compressed air being connected by said air supply line to the air metering device, a second metering device comprising a pump, the air metering device being a motor connected by said motion transmitting means to said pump, and a connection between the foaming agent supply line and the motor through which foaming agent flows through the motor to seal clearances in the air motor whereby the air motor operates with higher volumetric efficiency.

4. The system described in claim 3 characterized by the pump being in the foaming agent supply line in position to discharge foaming agent into the air supply line upstream of the air motor that is in the air supply line.

5. The system described in claim 1 characterized by a third metering device comprising a pump in the water supply line which is separate from the foaming agent supply line, the motion transmitting means driving the pump in the water supply line and the other metering devices in unison.

6. The system described in claim 1 characterized by the motion transmitting means including a variable ratio drive that is adjustable to change the ratio of air metered by the air metering action of the motor and the amount of water delivered to the foamer by the pump.

7. The system described in claim 1 characterized by a plurality of foamers, a common header to which the ingredients are supplied to the foamers, means for regulating the flow of each of the ingredients with respect to the other ingredient so as to maintain substantially constant ratios of the ingredients with variations of the demand for foam, said means for regulating the flow of ingredients being adjustable to change the ratio of ingredients that is to be maintained, and said means including compressed air bottles from which air is delivered to the air pressure regulator.

8. The system described in claim 1 characterized by an air compressor that supplies air to the air metering device, and a motor that drives the air compressor when the system is in operation.

9. The system described in claim 8 characterized by the means for regulating the pressure of the air supplied to the air metering device being a modulator that controls the amount of air that enters the compressor.

* * * * *